(12) United States Patent
Valasek (10) Patent No.: US 8,271,699 B2
(45) Date of Patent: Sep. 18, 2012

(54) PARALLEL ACCESSIBLE MEMORY SYSTEM ENABLING THE SIMULTANEOUS ACCESS TO BYTES OF DATA

(76) Inventor: Josef Valasek, Pardubice (CZ)

( * ) Notice: Subject to any disclaimer, the term of this patent is extended or adjusted under 35 U.S.C. 154(b) by 127 days.

(21) Appl. No.: 12/770,485

(22) Filed: Apr. 29, 2010

(65) Prior Publication Data

US 2010/0217896 A1    Aug. 26, 2010

Related U.S. Application Data

(63) Continuation-in-part of application No. PCT/CZ2008/000135, filed on Oct. 30, 2008.

(30) Foreign Application Priority Data

Oct. 31, 2007   (CZ) ..................... 2007-760

(51) Int. Cl.
*G06F 13/28* (2006.01)
*G11C 11/34* (2006.01)
(52) U.S. Cl. ..................... 710/22; 365/185.09
(58) Field of Classification Search .............. 710/22; 365/185.09
See application file for complete search history.

(56) References Cited

U.S. PATENT DOCUMENTS

| | | | |
|---|---|---|---|
| 4,247,970 A * | 2/1981 | Bollinger | 29/2 |
| 4,422,161 A * | 12/1983 | Kressel et al. | 365/185.09 |
| 5,005,852 A * | 4/1991 | Smyly, Sr. | 280/477 |
| 5,008,852 A | 4/1991 | Mizoguchi | |
| 5,247,630 A * | 9/1993 | Parks et al. | 711/1 |
| 6,754,741 B2 * | 6/2004 | Alexander et al. | 710/52 |
| 2001/0005324 A1* | 6/2001 | Chevallier | 365/51 |
| 2005/0270876 A1* | 12/2005 | Blanco et al. | 365/222 |

FOREIGN PATENT DOCUMENTS

EP    1517243 A2    3/2005

OTHER PUBLICATIONS

PCT/CZ2008/000135 International Search Report, issued Jul. 21, 2009, 4 pages.

* cited by examiner

*Primary Examiner* — Hyun Nam
(74) *Attorney, Agent, or Firm* — Hovey Williams LLP (57) ABSTRACT

A memory system includes n (n>1) memory arrays (1.1 to 1.n), a address decoder (2), a data connecting circuit (3), and a write controlling circuit (4). The address decoder (2) includes a decoder (5), and n−1 selectors (6.1 to 6.n−1). The memory system has an address bus (01) for lead in address A, k (k>1), input/output data buses (02.1 to 02.k) for data transmission, and a control bus (03) for lead in write control signals. The data is stored by bytes, each data byte D being addressable by one address A. After the address A has been set on the address bus (01), in memory arrays (1.1 to 1.n) the memory locations are activated in which the data bytes $D_A$, $D_{A+1}, \ldots, D_{A+k-1}$ are stored. The data connecting circuit (3) connects the data interfaces of the memory arrays (1.1 to 1.n) with the data buses (02.1 to 02.k) so that the first data bus (02.1) transmits the data byte $D_A$, and simultaneously the second data bus (02.2) transmits the data byte $D_{A+1}, \ldots$, and simultaneously the k-th data bus (02.k) transmits the data byte $D_{A+k-1}$. This parallel access memory provides parallel access to all bytes of sequentially arranged data, e.g. to unequal length instruction code, within one read/write memory cycle.

11 Claims, 5 Drawing Sheets

PARALLEL ACCESSIBLE MEMORY SYSTEM ENABLING THE SIMULTANEOUS ACCESS TO BYTES OF DATA

This application is a continuation-in-part of International Application No. PCT/CZ2008/000135, filed 30 Oct. 2008 and published as WO 2009/056080 on 7 May 2009, and claims the benefit of Czech patent application No. PV 2007-760 filed 31 Oct. 2007, the entire disclosures of which are incorporated herein by reference.

BACKGROUND OF THE INVENTION

1. Field of the Invention

The present invention relates generally to a digital computer or microcontroller memory system, and, more particularly, to a memory system which provides the simultaneous access to data by several data buses, and to a memory device which uses this system.

2. Description of the Prior Art

Simple processors are known that take the program code in bytes out of the memory synchronously with the executing program. The instruction, the instruction code which is one-byte-long, consumes one memory read cycle to take out the instruction code from the memory. The instruction, having two bytes long instruction code, consumes two memory read cycles to take the instruction code from the memory. Therefore, a longer instruction code consumes more processor time, regardless the function complexity thereof, due to which the available calculating performance is reduced.

Furthermore, there are powerful processors known as well which withdraw the program code out of the memory in advance and store it in the internal processor memory. In a suitable instance, the instruction code is taken out from the internal processor memory and used to perform the program. This enables to execute the program most swiftly and without processor time loss due to waiting for withdrawing the instruction code from the memory. However, such processors are more complicated and expensive.

Furthermore, the memory arrangement according to the U.S. Pat. No. 5,008,852 is known as well. To generate the signals addressing the memory locations in this solution, the address converting means are used. The address converting means convert the address which enters the memory to another address to address the memory locations. The address converting means comprise an adder circuit and a dividing circuit. There are some disadvantages of this solution because the address converting circuit is complicated and the address conversion lengthens out the memory access time.

SUMMARY OF THE INVENTION

The object of the present invention is to provide a parallel accessible memory system enabling the simultaneous access to a several bytes long data during one accessing operation and to provide a memory device for memory system assembling.

The memory system comprises n (where n is an integer greater than or equal to 2) memory arrays each including an array of memory cells, an address decoder, a connecting circuit, and a write controlling circuit. In each of the memory arrays, memory cells are arranged to memory locations. In each memory location q (q is an integer greater than or equal to 1) data bytes are stored. Each of the memory array has q data interfaces, each of the data interface transferring one data byte. The memory system has an address bus for leading in the address A, k (where k is an integer greater than or equal to 2 and less than or equal to (n×q)) input/output data buses for data transmission, and a control bus for leading in write control signals. Each data byte D, stored in the memory system, is addressable by a unique address A.

One aspect of the invention includes an address decoder which comprises a decoder and n−1 selectors. The address decoder is arranged so that the address bus is connected with the input of the decoder and with control inputs of selectors. The output of the decoder, which may be a binary decoder, is connected with select inputs of selectors and with a select input of the n-th memory array. The selector outputs are connected with the corresponding select inputs of the memory arrays.

Another aspect of the invention includes that in the memory system, data is stored so that the data byte addressed by the address A=0 is stored in the first byte of the first memory location of the first memory array, the data byte addressed by the address A=1 is stored in the second byte of the first memory location of the first memory array, . . . , the data byte addressed by the address A=q-1 is stored in the q-th byte of the first memory location of the first memory array, the data byte addressed by the address A=q is stored in the first byte of the first memory location of the second memory array, . . . , the data byte addressed by the address A=(n×q-1) is stored in the q-th byte of the first memory location of the n-th memory array, the data byte addressed by the address A=(n×q) is stored in the first byte of the second memory location of the first memory array, . . . .

A further aspect of the invention includes that the data connecting circuit connects, depending on the address A value, data interfaces of memory arrays with data buses so that the first data bus transmits the byte addressed by the address A (data byte $D_A$), and simultaneously the second data bus transmits the byte addressable by the address A+1 (data byte $D_{A+1}$), and so forth.

The memory device arrangement is deduced from that of the memory system. The memory device comprises the memory array including an array of memory cells, and an address decoder. The memory device has an address input for leading in an address A, an input/output data interface for data transmission, a control input for leading in a write control signal and an identification input for leading in a value of the memory device position in the memory system.

An additional aspect of the invention includes that the address decoder comprises a decoder, which may be a binary decoder, and a selector. The address decoder is arranged so that the address input of the memory device is connected with an input of the decoder. An output of the decoder is connected with a select input of the selector. The output of the selector is connected with the select input of the memory array.

In a further aspect of the invention, the address decoder further comprises a comparator. The address decoder is arranged so that the address input of memory device is further connected with an address input of the comparator. The identification input of the memory device is connected with an identification input of the comparator. A comparator output is connected with a control input of the selector.

BRIEF DESCRIPTION OF THE DRAWINGS

These and other objects, features and advantages of the present invention will become apparent from the following description of the preferred embodiments taken in conjunction with the accompanying drawings, in which.

DETAILED DESCRIPTION OF THE PREFERRED EMBODIMENTS

The embodiments of the present invention will be described in detail below with reference to the accompanying drawings.

First Embodiment

Figure 1:
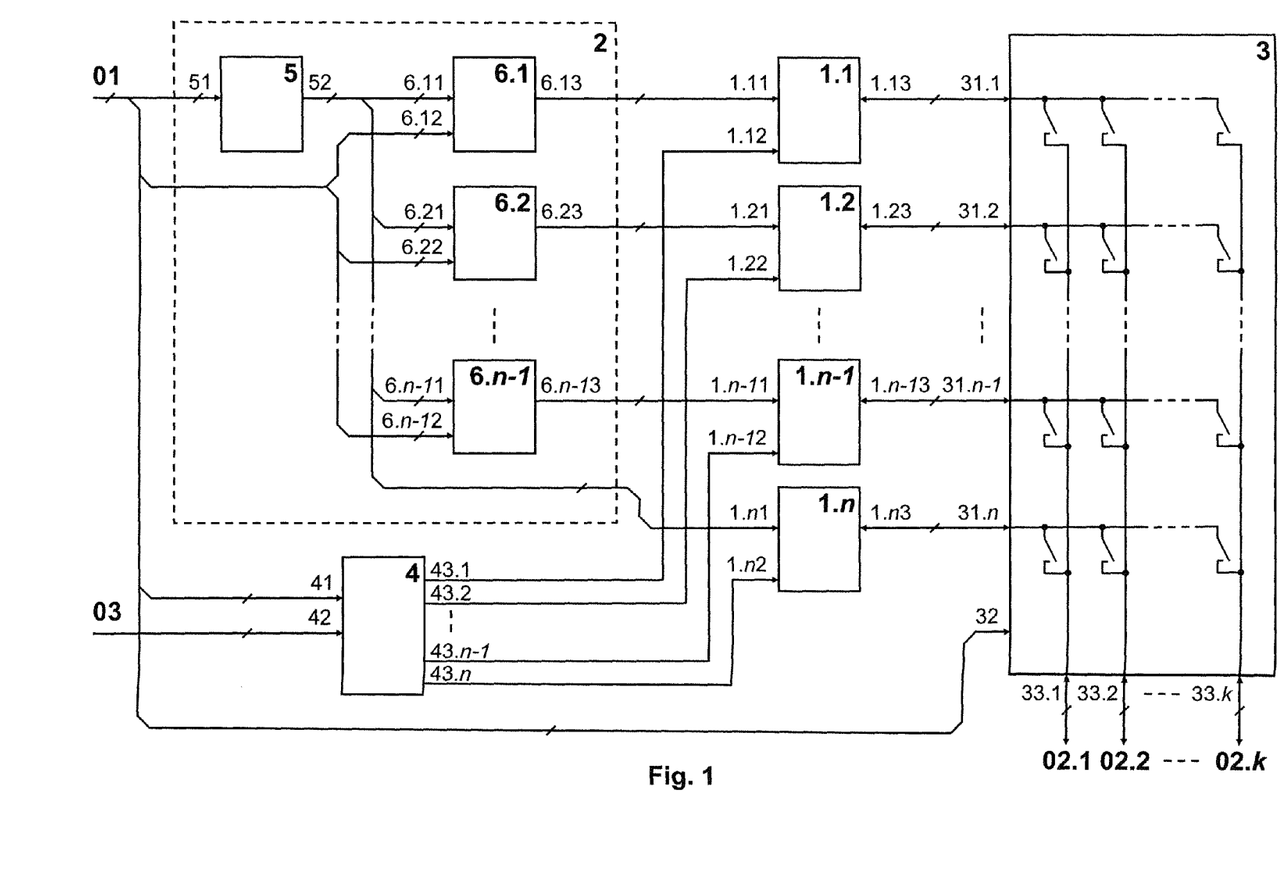
FIG. 1 is a general block diagram showing the general arrangement of a memory system according to a first embodiment of the present invention.

FIG. 1 is a block diagram showing the general arrangement of a memory system according to a first embodiment of the present invention. The memory system, shown in FIG. 1, comprises n memory arrays 1.1 to 1.n, an address decoding circuit 2, a data connecting circuit 3, and a write controlling circuit 4. The address decoding circuit 2 comprises a decoder 5 and n−1 selectors 6.1 to 6.n−1. The memory system has an address bus 01 for leading in address A, k input/output data buses 02.1 to 02.k for data transmission, and a control bus 03 for leading in write control signals.

The memory system is connected so that the address bus bus 01 is connected with the input 51 of the decoder 5, with control inputs 6.12 to 6.n−12 of corresponding selectors 6.1 to 6.n−1, with the address input 41 of the write controlling circuit 4, and with an address input 32 of the data connecting circuit 3. An output 52 of the decoder 5 is connected with the select inputs 6.11 to 6.n−11 of the corresponding selectors 6.1 to 6.n−1 and with the select input 1.n1 of the memory array 1.n. The outputs 6.13 to 6.n−13 of the corresponding selectors 6.1 to 6.n−1 are connected with the corresponding select inputs 1.11 to 1.n−11 of the corresponding memory arrays 1.1 to 1.n−1. The control bus 03 is connected with a control input 42 of the write controlling circuit 4. Outputs 43.1 to 43.n of the write controlling circuit 4 are connected with corresponding control inputs 1.12 to 1.n2 of corresponding memory arrays 1.1 to 1.n. The data interface 1.13 of the memory array 1.1 is connected with a data interface 31.1 of the data connecting circuit 3, and a data interface 1.23 of the memory array 1.2 is connected with a data interface 31.2 of the data connecting circuit 3, and so forth, i.e., the data interface 1.n−13 of the memory array 1.n−1 is connected with the data interface 31.n−1 of the data connecting circuit 3, and the data interface 1.n3 of the memory array 1.n is connected with the data interface 31.n of the data connecting circuit 3. Data buses 33.1 to 33.k of the data connecting circuit 3 are connected with the corresponding data buses 02.1 to 02.k.

Memory arrays 1.1 to 1.n are well known circuits each one including an array of memory cells. In each of the memory array 1.1 to 1.n the memory cells are arranged into memory locations. In each memory location, one data byte D is stored (q=1). In each of the memory array 1.1 to 1.n the memory locations are arranged in rows and columns. The row and column of the memory location are selected by selecting signals led to the select input of the memory array. If one row and one column are selected, one memory location is activated in the memory array.

The decoder 5 is a well known combinational circuit.

The selectors 6.1 to 6.n−1 are combinational circuits.

The data connecting circuit 3 is a well known circuit comprising a switch matrix and a decoder. The data connecting circuit 3 has p (where p is an integer greater than or equal to n and less that or equal to (n×q)) data interfaces and k data buses.

The write controlling circuit 4 is a well known combinational circuit.

In the memory system the data are stored so that the data byte, addressable by the address A=0, is stored in the first memory location of the memory array 1.1, the data byte, addressable by the address A=1, is stored in the first memory location of the memory array 1.2, and so forth, i.e., the data byte, addressable by the address A=n−2, is stored in the first memory location of the memory array 1.n−1, the data byte, addressable by the address A=n−1, is stored in the first memory location of the memory array 1.n, the data byte, addressable by the address A=n, is stored in the second memory location of the memory array 1.1, and the data byte, addressable by the last address A, is stored in the last memory location of the memory array 1.n.

Second Embodiment

Depending on the number k of data buses, in some memory system configurations more data bytes can be stored in each memory location. It allows the number of memory arrays can be reduced and the memory system configuration becomes simpler.

Figure 2:
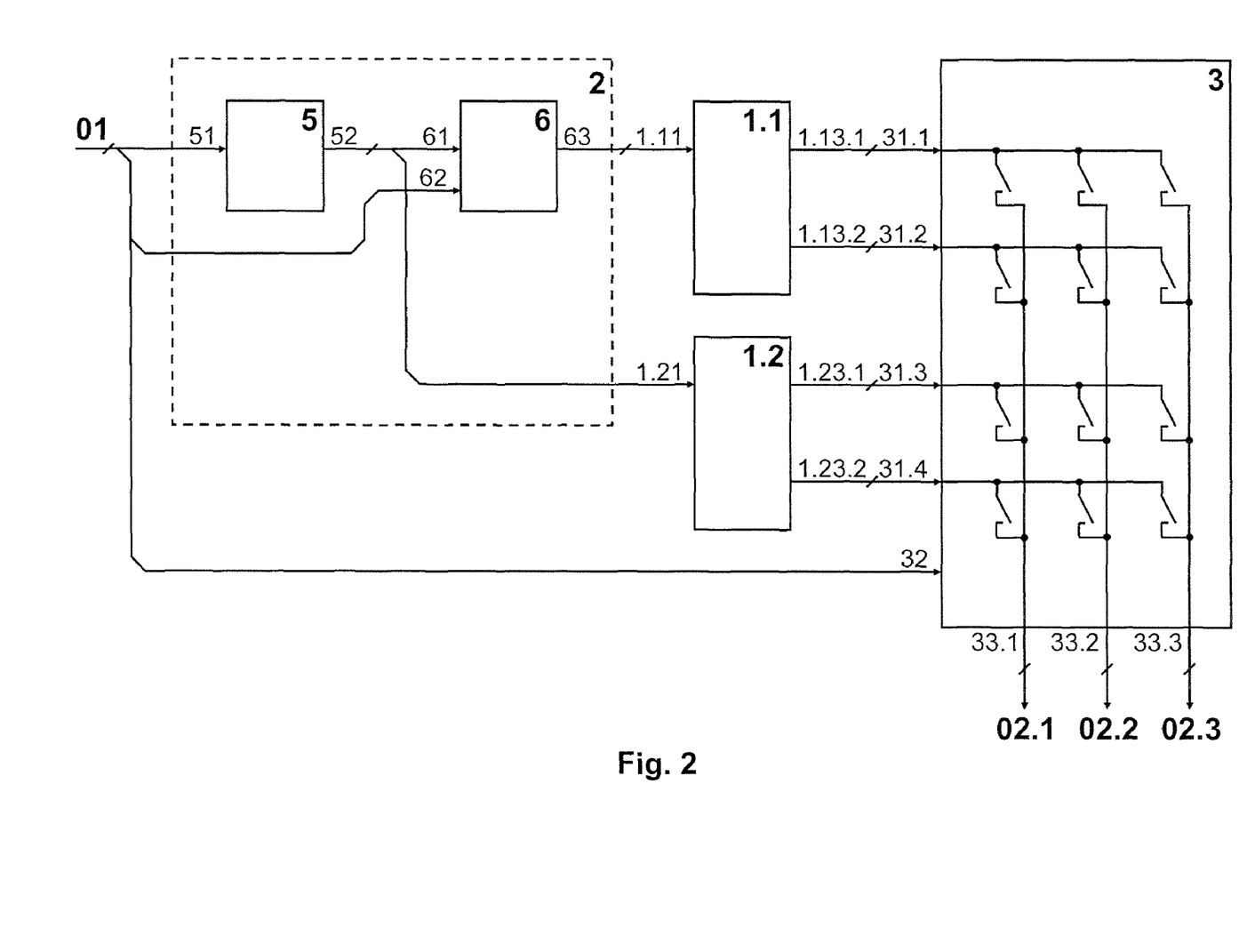
FIG. 2 is a block diagram showing the arrangement of a microcontroller program memory according to a second embodiment of the present invention.

FIG. 2 is a block diagram showing the arrangement of a microcontroller (also known as a microprocessor) program memory according to a second embodiment of the present invention. The microcontroller program memory, shown in FIG. 2, is the ROM (Read Only Memory) type memory with the capacity of 4096 bytes and is used for storing of a program code for the microcontroller, the code instructions of which are from 1 to 3 bytes long.

The microcontroller program memory comprises memory arrays 1.1 and 1.2 (n=2), the address decoding circuit 2, and the data connecting circuit 3.

Each of the memory arrays 1.1 and 1.2 includes an array of 128×128 memory cells, divided into 1024 memory locations each of which having the capacity of 2 bytes (q=2). The memory locations are arranged into 128 rows×8 columns. Each memory location is addressable by the serial number in (m=0, 1, . . . , 1023). The arrangement of rows and columns of the memory locations in each of the memory arrays 1.1 and 1.2, with given serial numbers of in memory locations, is shown in Tab. 1.

TABLE 1

| Rows | | | | | | |
|---|---|---|---|---|---|---|
| 127 | 127 | 255 | | | 895 | 1023 |
| 126 | 126 | 254 | | | 894 | 1022 |
| ⋮ | ⋮ | ⋮ | | | ⋮ | ⋮ |
| 1 | 1 | 129 | | | 769 | 897 |
| 0 | 0 | 128 | | | 768 | 896 |
| | 0 | 1 | - | - - | 6 | 7 |
| | | | Columns | | | |

Each memory array has two data interfaces, each one for one data byte output. Through the data interface 1.13.1 of the memory array 1.1 the data exits, which is stored in the first byte of the activated memory location, through the data interface 1.13.2 of the memory array 1.1 the data exits, which is stored in the second byte of the activated memory location. Through the data interface 1.23.1 of the memory array 1.2 the data exits, which is stored in the first byte of the activated memory location, through the data interface 1.23.2 of the memory array 1.2 the data exits, which is stored in the second byte of the activated memory location.

The address decoding circuit 2 comprises the binary decoder 5 and the selector 6.

The data connecting circuit 3 has four data interfaces (p=4) and three data buses (k=3).

The memory system has the 12-bit address bus bus 01 for leading in address A and three data buses 02.1 to 02.3, each one for output of one instruction code byte.

The microcontroller program memory is connected so that the address bus bus 01 is connected with the input 51 of the binary decoder 5, with the control input 62 of the selector 6, and with the address input 32 of the data connecting circuit 3. The output 52 of the binary decoder 5 is connected with the select input 61 of the selector 6, and with the select input 1.21 of the memory array 1.2. The output 63 of the selector 6 is connected with the select input 1.11 of the memory array 1.1. The data interface 1.13.1 of the memory array 1.1 is connected with the data interface 31.1 of the data connecting circuit 3. The data interface 1.13.2 of the memory array 1.1 is connected with the data interface 31.2 of the data connecting circuit 3. The data interface 1.23.1 of the memory array 1.2 is connected with the data interface 31.3 of the data connecting circuit 3. The data interface 1.23.2 of the memory array 1.2 is connected with the data interface 31.4 of the data connecting circuit 3. The data buses 33.1 to 33.3 of the data connecting circuit 3 are connected with the corresponding data buses 02.1 to 02.3.

In each memory location, two bytes of the program code are stored. The program code byte addressable by the address A=0 is stored in the first byte of the first memory location of the memory array 1.1, the program code byte addressable by the address A=1 is stored in the second byte of the first memory location of the memory array 1.1, the program code byte, addressable by the address A=2, is stored in the first byte of the first memory location of the memory array 1.2, the program code byte addressable by the address A=3 is stored in the second byte of the first memory location of the memory array 1.2, the program code byte addressable by the address A=4 is stored in the first byte of the second memory location of the memory array 1.1, . . . , and the program code byte addressable by the last address A is stored in the second byte of the last memory location of the memory array 1.2.

The address decoding circuit 2 works so that, after the address A has been set on the address bus 01, the binary decoder 5 generates the select signals to select the memory location with the serial number in where m=A div 4

(where "div" denotes the integer dividing). The select signals, generated by the binary decoder 5, activate the memory location with the serial number m in the memory array 1.2. In dependence on the value of the address A, the selector 6 generates select signals which activates either the memory location with the serial number m or the memory location with the serial number m+1 in the memory array 1.1. The way the memory locations are activated in the memory arrays 1.1 and 1.2, in dependence on the values of the least significant bites A1 and A0 of the address A, is shown in Tab. 2.

TABLE 2

| Address | | Memory array | |
|---|---|---|---|
| A1 | A0 | 1.1 | 1.2 |
| 0 | 0 | m | m |
| 0 | 1 | m | m |
| 1 | 0 | m + 1 | m |
| 1 | 1 | m + 1 | m |

The data connecting circuit 3 operates so that, after the address A has been set on the address bus 01, connects the data interfaces 31.1 to 31.4 with the data buses 33.1 to 33.3. The way the data interfaces 31.1 to 31.4 are connected with the data buses 33.1 to 33.3, depending on the values of the least significant bites A1 and A0 of the address A, is shown in Tab. 3.

TABLE 3

| Address | | Data buses | | |
|---|---|---|---|---|
| A1 | A0 | 33.1 | 33.2 | 33.3 |
| 0 | 0 | 31.1 | 31.2 | 31.3 |
| 0 | 1 | 31.2 | 31.3 | 31.4 |
| 1 | 0 | 31.3 | 31.4 | 31.1 |
| 1 | 1 | 31.4 | 31.1 | 31.2 |

The microcontroller program memory operates so that after the address A has been set on the address bus 01, the address decoding circuit 2 generates select signals which activate one memory location in each of the memory array 1.1 and 1.2. So the memory locations are activated in which the bytes of the program code bytes $D_A$, $D_{A+1}$ and $D_{A+2}$ are stored. The data connecting circuit 3 connects the data interfaces 1.13.1 and 1.13.2 of the memory array 1.1 and the data interfaces 1.23.1 and 1.23.2 of the memory array 1.2 with the data buses 02.1 to 02.3 so that the data interface, through which the program code byte $D_A$ goes out, is connected with the data bus 02.1, and the data interface, through which the program code byte $D_{A+1}$ goes out, is connected with the data bus 02.2, and the data interface, through which the program code byte $D_{A+2}$ goes out, is connected with the data bus 02.3.

Figure 3:
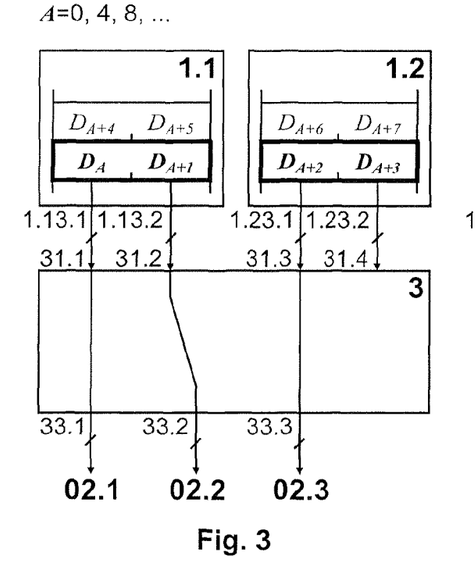
FIG. 3 is an explanatory view showing the concept of parallel accessing to the microcontroller program memory for the addresses A=0, 4, 8, . . .

FIG. 3 is explanatory view showing the concept of a parallel accessing to the microcontroller program memory if the address is A=0, 4, 8, . . . . After setting the address A, in the memory array 1.1 the memory location is activated in which the code program bytes $D_A$ and $D_{A+1}$ are stored, and in the memory array 1.2 the memory location is activated in which the code program bytes $D_{A+2}$ and $D_{A+3}$ are stored. The content of the activated memory locations is outputted to the data buses 02.1 to 02.3 through the data connecting circuit 3. The content of the second byte of the activated memory location of the memory array 1.2 is not utilized.

Figure 4:
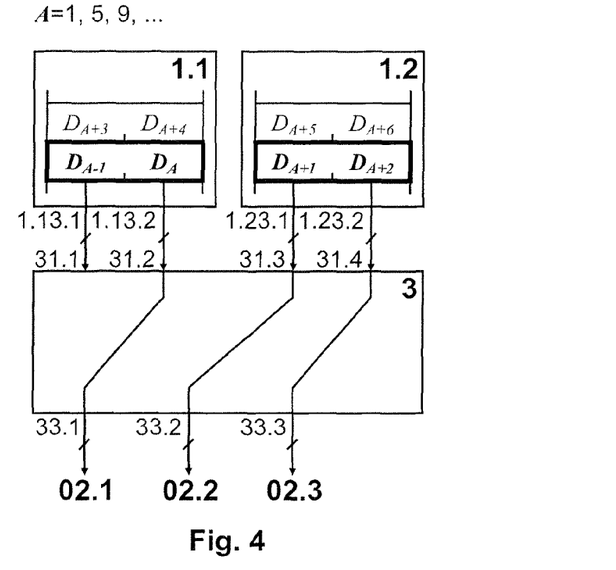
FIG. 4 is an explanatory view showing the concept of parallel accessing to the microcontroller program memory for the addresses A=1, 5, 9, . . .

FIG. 4 is explanatory view showing the concept of a parallel accessing to the microcontroller program memory if the address is A=1, 5, 9, . . . . After setting the address A, in the memory array 1.1 the memory location is activated in which the code program bytes $D_{A-1}$ and $D_A$ are stored, and in the memory array 1.2 the memory location is activated in which the code program bytes $D_{A+1}$ and $D_{A+2}$ are stored. The content of the activated memory locations is outputted to the data buses 02.1 to 02.3 through the data connecting circuit 3. The content of the first byte of the activated memory location of the memory array 1.1 is not utilized.

Figure 5:
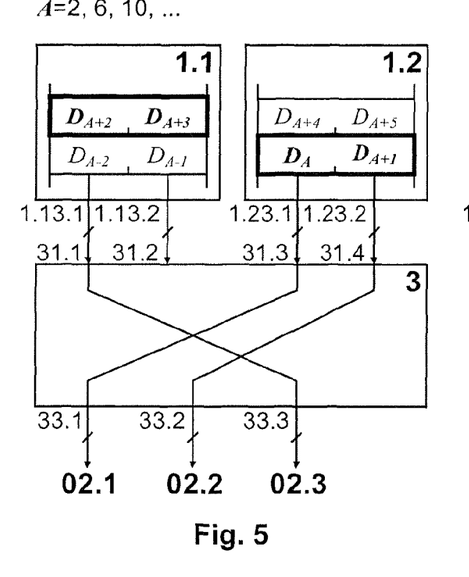
FIG. 5 is an explanatory view showing the concept of parallel accessing to the microcontroller program memory for the addresses A=2, 6, 10, . . .

FIG. 5 is explanatory view showing the concept of a parallel accessing to the microcontroller program memory if the address is A=2, 6, 10, . . . . After setting the address A, in the memory array 1.1 the memory location is activated in which the code program bytes $D_{A+2}$ and $D_{A+3}$ are stored, and in the memory array 1.2 the memory location is activated in which the code program bytes $D_A$ and $D_{A+1}$ are stored. The content of the activated memory locations is outputted to the data buses 02.1 to 02.3 through the data connecting circuit 3. The content of the second byte of the activated memory location of the memory array 1.1 is not utilized.

Figure 6:
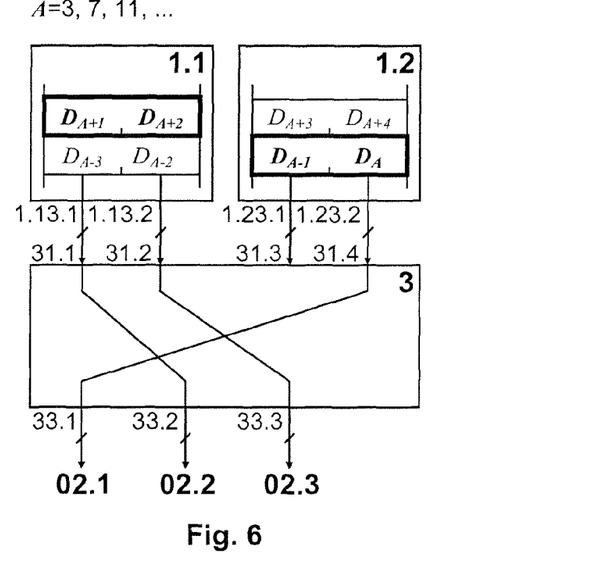
FIG. 6 is an explanatory view showing the concept of parallel accessing to the microcontroller program memory for the addresses A=3, 7, 11, . . .

FIG. 6 is explanatory view showing the concept of a parallel accessing to the microcontroller program memory if the address is A=3, 7, 11, . . . . After setting the address A, in the memory array 1.1 the memory location is activated in which the code program bytes $D_{A+1}$ and $D_{A+2}$ are stored and in the memory array 1.2 the memory location is activated in which the code program bytes $D_{A-1}$ and $D_A$ are stored. The content of the activated memory locations is outputted to the data buses 02.1 to 02.3 through the data connecting circuit 3. The content of the first byte of the activated memory location of the memory array 1.2 is not utilized.

Figure 7:
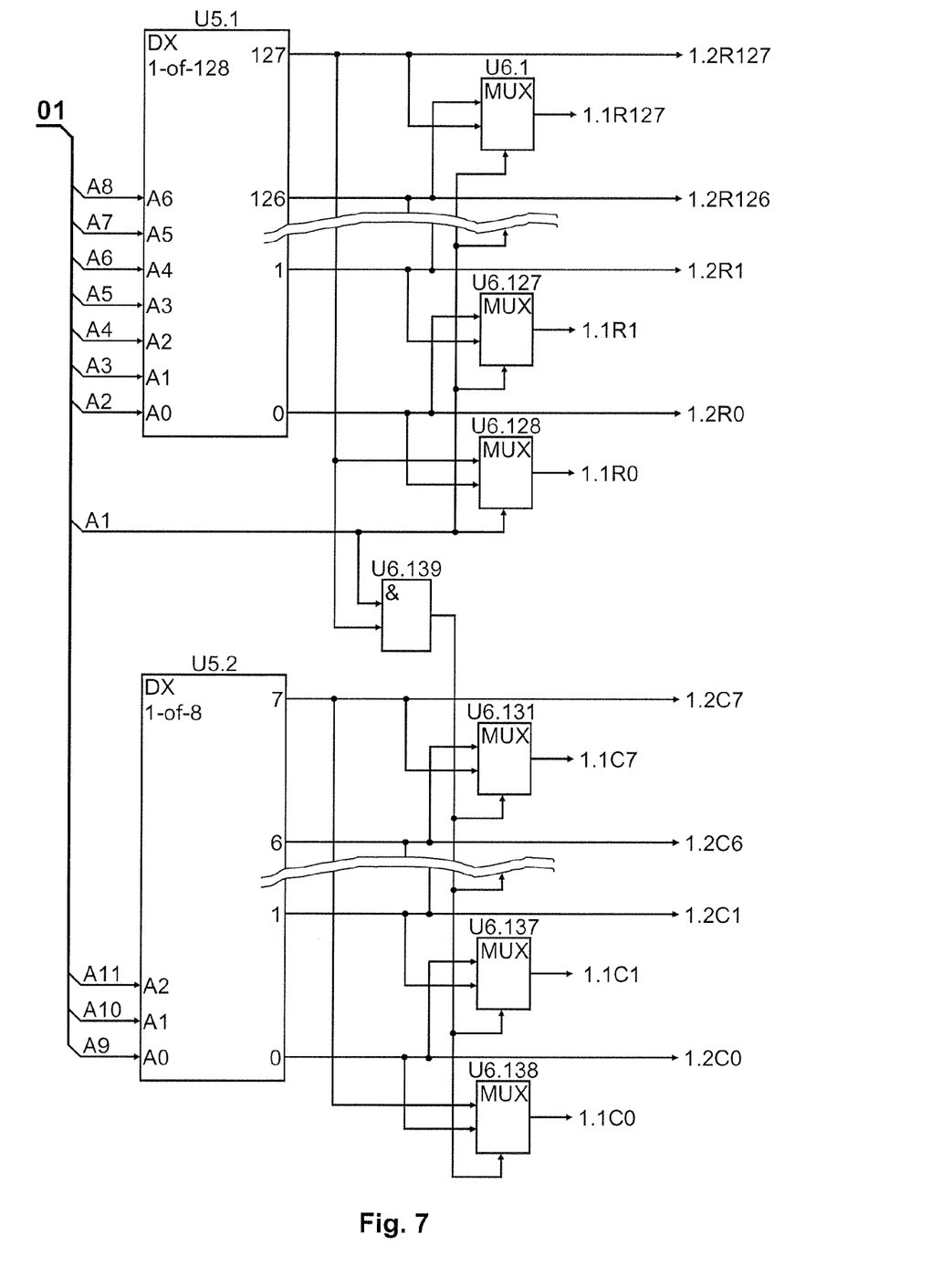
FIG. 7 is an exemplary schematic diagram of an address decoder circuit of the microcontroller program memory.

FIG. 7 is an exemplary schematic diagram of the address decoder circuit 2 of the microcontroller program memory. In this circuit the positive logic is applied. The binary decoder 5 comprises the components U5.1 and U5.2. The selector 6 comprises the components U6.1 to U6.128, the components U6.131 to U6.138, and the component U6.139. The function of the components U6.1 to U6.128, and of the components U6.131 to U6.138 is shown in the Tab. 4.

TABLE 4

| A | B | S | Y |
|---|---|---|---|
| X | 0 | 0 | 0 |
| X | 1 | 0 | 1 |
| 0 | X | 1 | 0 |
| 1 | X | 1 | 1 |

X - Don't care

The select signals names to select the rows of the memory locations and the columns of the memory locations in the memory arrays 1.1 and 1.2 are consisted of the memory array mark ("1.1" or "1.2"), of th letter ("R" for rows or "C" for columns), and of the serial number of a row or a column. For an example the select signal named 1.2R127 denotes the select signal to choose the 127-th row of the memory locations in the memory array 1.2.

Third Embodiment

The present state of the technology does not enable one to make the digital computer memory on one chip. Therefore, the digital computer memory is made comprising several devices.

Figure 8:
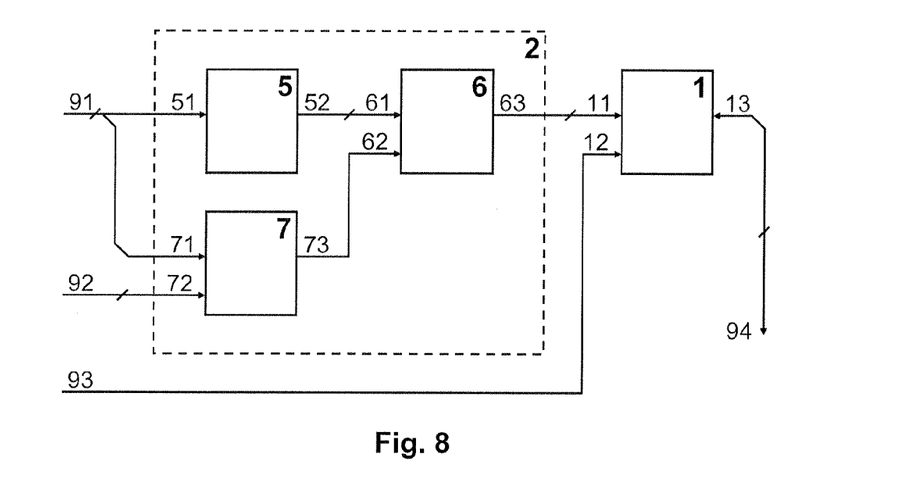
FIG. 8 is a block diagram showing the arrangement of a memory device according to a third embodiment of the present invention.

FIG. 8 is a block diagram showing the arrangement of a memory device according to the third embodiment of the present invention. The memory device, shown in FIG. 8, comprises the memory array 1 and the address decoding circuit 2. The address decoding circuit 2 comprises the decoder 5, the selector 6, and the comparator 7. The memory device has the address input 91 for lead in address A, the identification input 92 for lead in value of memory device position in the digital computer memory, the control input 93 to control the writing, and the data interface 94 for transmission of one data byte.

The memory device is connected so that the address input 91 of the memory device is connected with the input 51 of the decoder 5 and with the address input 71 of the comparator 7. The output 52 of the decoder 5 is connected with the select input 61 of the selector 6. The identification input 92 of the memory device is connected with the identification input 72 of the comparator 7. The output 73 of the comparator 7 is connected with the control input 62 of the selector 6. The output 63 of the selector 6 is connected with the select input 11 of the memory array 1. The control input 93 of the memory device is connected with the control input 12 of the memory array 1. The data interface 13 of the memory array 1 is connected with the data interface 94 of the memory device.

The memory array 1 include an array of memory cells which is divided into memory locations. In each memory location, one data byte is stored.

The comparator 7 is a well known combinational circuit which compares the value lead in to the address input 71 with the value set on the identification input 72. The function of the comparator 7 is shown in Tab. 5.

TABLE 5

| A, B | Y |
|------|---|
| A < B | 0 |
| A = B | 0 |
| A > B | 1 |

Figure 9:
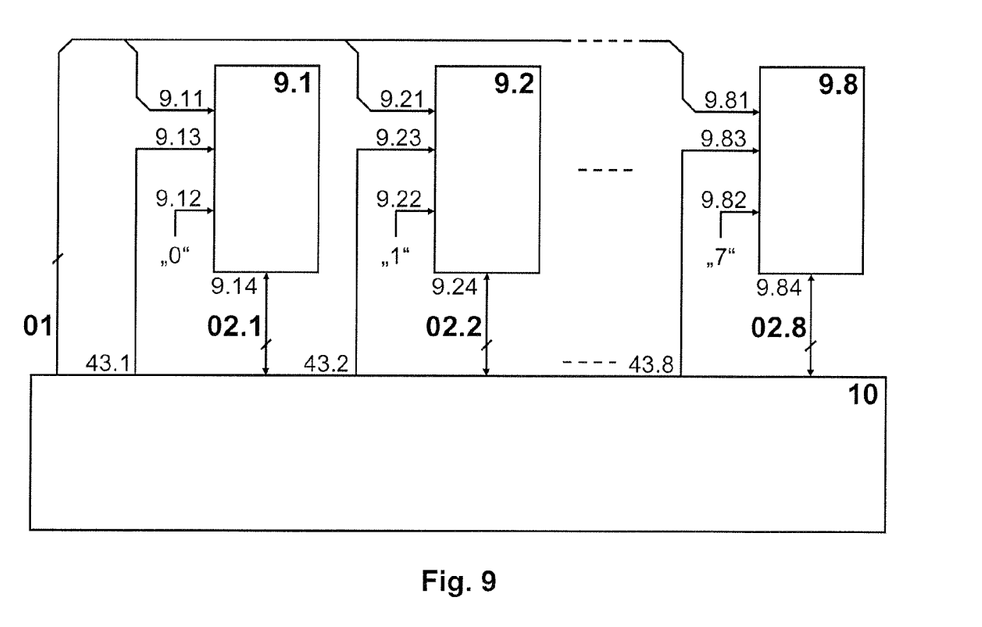
FIG. 9 is a block diagram showing the arrangement of a digital computer memory using memory devices.

FIG. 9 is a block diagram showing the arrangement of digital computer memory using memory devices. The digital computer memory, shown in FIG. 9, comprises eight identical memory devices 9.1 to 9.8 which are connected to the processor 10 in an identical way. The digital computer memory has the address bus bus 01 for leading in address A, the data buses 02.1 to 02.8 for data transmission, and the control signals 43.1 to 43.8 for leading in write control signals. The data connecting circuit and the write controlling circuit are integrated in the processor 10 and are not shown in FIG. 9.

The digital computer memory is connected so that the address bus bus 01 is connected with the address inputs 9.11 to 9.81 of the corresponding memory devices 9.1 to 9.8. The output 43.1 of the processor 10 is connected with the write control input 9.13 of the memory device 9.1, the output 43.2 of the processor 10 is connected with the write control input 9.23 of the memory device 9.2, . . . , and the output 43.8 of the processor 10 is connected with the write control input 9.83 of the memory device 9.8. The identification input 9.12 of the memory device 9.1 is set on the value 0, the identification input 9.22 of the memory device 9.2 is set on the value 1, . . . , and the identification input 9.82 of the memory device 9.8 is set on the value 7. The data interface 9.14 of the memory device 9.1 is connected with the data bus 02.1, the data interface 9.24 of the memory device 9.2 is connected with the data bus 02.2, . . . , and the data interface 9.84 of the memory device 9.8 is connected with the data bus 02.8.

In the digital computer memory the data is stored so that the byte addressed by the address A=0 is stored in the first memory location of the memory array 1 of the memory device 9.1, the byte addressed by the address A=1 is stored in the first memory location of the memory array 1 of the memory device 9.2, . . . , the byte addressed by the address A=7 is stored in the first memory location of the memory array 1 of the memory device 9.8, the byte addressed by the address A=8 is stored in the second memory location of the memory array 1 of the memory device 9.1, . . . .

The digital computer memory works so that, after setting the address A on the address bus 01, in each memory device 9.1 to 9.8 the binary decoder 5 generate the select signals to select the memory location with a serial number m where $$m = A \text{ div } 8$$

(where the "div" denotes the integer dividing). In each memory device 9.1 to 9.8 the selector 6 activate either the memory location with the serial number m or the memory location with the serial number m+1 in memory array 1. The way the memory locations, in the memory arrays 1 of the memory devices 9.1 to 9.8, are activated, in dependence on the least significant bites A2 to A0 of the address A, is shown in Tab. 6.

TABLE 6

| Address | | | Memory device | | | | | | | |
|---|---|---|---|---|---|---|---|---|---|---|
| A2 | A1 | A0 | 9.1 | 9.2 | 9.3 | 9.4 | 9.5 | 9.6 | 9.7 | 9.8 |
| 0 | 0 | 0 | m | m | m | m | m | m | m | m |
| 0 | 0 | 1 | m+1 | m | m | m | m | m | m | m |
| 0 | 1 | 0 | m+1 | m+1 | m | m | m | m | m | m |
| 0 | 1 | 1 | m+1 | m+1 | m+1 | m | m | m | m | m |
| 1 | 0 | 0 | m+1 | m+1 | m+1 | m+1 | m | m | m | m |
| 1 | 0 | 1 | m+1 | m+1 | m+1 | m+1 | m+1 | m | m | m |
| 1 | 1 | 0 | m+1 | m+1 | m+1 | m+1 | m+1 | m+1 | m | m |
| 1 | 1 | 1 | m+1 | m+1 | m+1 | m+1 | m+1 | m+1 | m+1 | m |

So, the memory locations are activated in which the bytes $D_A$, $D_{A+1}$, and $D_{A+7}$ are stored. The activated memory locations are connected with the data buses 02.1 to 02.8 through the data interfaces 9.14 to 9.84 of corresponding memory devices 9.1 to 9.8.

What is claimed is:

1. A parallel accessible memory system enabling the simultaneous access to bytes of data, comprising:
   n (where n is an integer greater than or equal to 2) memory arrays for storing data, each memory array having:
   q (where q is an integer greater than or equal to 1) data interface or data interfaces for transferring data;
   a decoder for receiving an address A from an address bus and for outputting an n sets of select signals as an access request to the n memory arrays; and
   (n−1) selector or selectors respectively corresponding to said each memory array other than the n-th memory array,
   each selector being arranged for receiving an (n−1) set of select signals from the decoder, for receiving the address A from the address bus, and for outputting the (n−1) set of select signals as an access request to its respective memory array,
   wherein the n-th set of select signals output from the decoder bypasses the selectors and is directly received by the n-th memory array.

2. The parallel accessible memory system enabling the simultaneous access to bytes of data as set forth in claim 1, wherein the decoder is a binary decoder.

3. The parallel accessible memory system enabling the simultaneous access to bytes of data as set forth in claim 1, wherein the selector generates a set of select signals in accordance with the address A value.

4. The parallel accessible memory system enabling the simultaneous access to bytes of data as set forth in claim 1, further comprising a data connecting circuit arranged for receiving the address A from the address bus, and for connecting the p=(n×q) data interfaces of the memory arrays with k (where k is an integer greater than or equal to 2 and less than or equal to p) data buses.

5. The parallel accessible memory system enabling the simultaneous access to bytes of data as set forth in claim 4, wherein the data connecting circuit connects the p data interfaces with k data buses in accordance with the address A value.

6. The parallel accessible memory system enabling the simultaneous access to bytes of data as set forth in claim 1, wherein each memory array further has a write control input for receiving the write control signal.

7. The parallel accessible memory system enabling the simultaneous access to bytes of data as set forth in claim 6, further comprising a write controlling circuit for receiving the address A from the address bus, for receiving control signals from a control bus, and for outputting write control signals to write control inputs of memory arrays.

8. The parallel accessible memory system enabling the simultaneous access to bytes of data as set forth in claim 7, wherein the write controlling circuit generates write control signals in accordance with the address A value.

9. A parallel accessible memory system enabling the simultaneous access to bytes of data, comprising:
   n (where n is an integer greater than or equal to 2) memory arrays for storing data;
   data stored in bytes in said memory arrays; and
   a plurality of memory addresses, each byte of data having a unique one of said memory addresses,
   wherein each of the memory arrays has a plurality of memory locations,
   wherein one data byte is stored in one memory location, and wherein a data byte addressed by a first address of said plurality of memory addresses, which is a lowest one of said memory addresses, is stored in a first memory location of said plurality of memory locations of a first memory array of said n memory arrays, and a data byte addressed by a second address of said plurality of memory addresses, which is higher than said first address, is stored in a first memory location of said plurality of said memory locations of a second memory array of said n memory arrays, and a data byte addressed by a highest address of said plurality of memory addresses is stored in a last memory location of said plurality of memory locations of a last one of said n memory arrays.

10. A parallel accessible memory system enabling the simultaneous access to bytes of data, comprising:
n (where n is an integer greater than or equal to 2) memory arrays for storing data;
data stored in bytes in said memory arrays; and
a plurality of memory addresses, each byte of data having a unique one of said memory addresses,
wherein each of said memory arrays has a plurality of memory locations,
wherein g (where g is an integer greater than or equal to 2) data bytes are stored in one of said plurality of memory locations, and wherein a data byte addressed by a first address of said plurality of memory addresses, which is a lowest one of said memory addresses, is stored in a first byte of a first memory location of said plurality of memory locations of a first memory array of said n memory arrays, a data byte addressed by a second address of said plurality of memory addresses, which is higher than said first address, is stored in a second byte of the first memory location of said plurality of memory locations of the first memory array of said n memory arrays, a data byte addressed by a (g+1)-th address is stored in a first byte of a first memory location of said plurality of memory locations of a second memory array of said n memory arrays, and a data byte addressed by a highest address of said plurality of memory addresses is stored in a g-th byte of a last memory location of the last one of said n memory arrays.

11. A parallel accessible memory system enabling the simultaneous access to bytes of data, comprising:
n (where n is an integer greater than or equal to 2) memory arrays for storing data, each memory array having:
q (where q is an integer greater than or equal to 1) data interface or data interfaces for transferring data;
a decoder for receiving an address A from an address bus and for outputting an n sets of select signals as an access request to the n memory arrays; and
(n−1) selector or selectors respectively corresponding to said each memory array other than the n-th memory array,
each selector being arranged for receiving an (n−1) set of select signals from the decoder, for receiving the address A from the address bus, and for outputting the (n−1) set of select signals as an access request to its respective memory array,
wherein the data is stored in the memory arrays in bytes and each of the bytes of data stored in the memory arrays can be addressed by a unique address,
wherein each of the memory arrays has a plurality of memory locations, wherein one data byte is stored in one memory location, and wherein a data byte addressed by a first address, which is a lowest address, is stored in a first memory location of a first memory array, a data byte addressed by a second address, which is higher than the first address, is stored in a first memory location of a second memory array, and a data byte addressed by a highest address is stored in a last memory location of the last memory array.

* * * * *

UNITED STATES PATENT AND TRADEMARK OFFICE
CERTIFICATE OF CORRECTION

PATENT NO. : 8,271,699 B2
APPLICATION NO. : 12/770485
DATED : September 18, 2012
INVENTOR(S) : Josef Valasek It is certified that error appears in the above-identified patent and that said Letters Patent is hereby corrected as shown below:

IN THE SPECIFICATIONS:

Column 2, line 24, after "by the address" change "A=(nxq-1)" to "A=(nxq-1)".

Column 3, lines 30-32, add spacing lines to appear as:

drawings.

First Embodiment

FIG. 1 is a block diagram showing the general arrangement

Column 3, lines 43-44, delete "bus" (second occurrence).

Column 5, line 28, delete "bus" (second occurrence).

Column 5, line 32, delete "bus" (second occurrence).

Column 6, line 4, change font size of "m=A div 4" to appear in the same size text as the text in the previous and following lines and delete the extra line before the equation.

Column 7, line 58, after "(1.1" or "1.2"), of', delete "th" and substitute therefor "the".

Column 7, line 62-64, add spacing to appear as:

tions in the memory array 1.2.

Third embodiment

Signed and Sealed this
Sixth Day of November, 2012

David J. Kappos
*Director of the United States Patent and Trademark Office*

The present state of technology does not enable one to

Column 8, line 48, delete "bus" (second occurrence).

Column 8, line 54, delete "bus" (second occurrence).

Column 8, line 65, after "value", delete "7" and substitute therefor "7".

Column 9, line 18, change the font size of "m=A div 8" to appear in the same size text as in the previous and following lines.